(12) United States Patent
Keshavan et al.

(10) Patent No.: US 7,229,077 B2
(45) Date of Patent: Jun. 12, 2007

(54) ORDERED ELASTOMERIC COMPOSITE MATERIAL

(75) Inventors: Madapusi K. Keshavan, The Woodlands, TX (US); Anthony Griffo, The Woodlands, TX (US); Alysia C. White, Fulshear, TX (US); Robert Denton, Pearland, TX (US); Patricia Heel, Chino Hills, CA (US); Leroy N. Tinkham, Upland, CA (US); Michael A. Siracki, The Woodlands, TX (US)

(73) Assignee: Smith International, Inc., Houston, TX (US)

( * ) Notice: Subject to any disclaimer, the term of this patent is extended or adjusted under 35 U.S.C. 154(b) by 0 days.

(21) Appl. No.: 10/460,345

(22) Filed: Jun. 11, 2003

(65) Prior Publication Data

US 2004/0251052 A1    Dec. 16, 2004

(51) Int. Cl.
*F16J 15/20*    (2006.01)
(52) U.S. Cl. ............... 277/540; 277/536; 277/651; 277/652; 428/373; 428/376; 428/378
(58) Field of Classification Search ............... 277/336, 277/584, 589, 650, 651, 652, 920, 536, 540; 428/373, 375, 376, 378
See application file for complete search history.

(56) References Cited

U.S. PATENT DOCUMENTS

| | | | | |
|---|---|---|---|---|
| 3,049,385 A | * | 8/1962 | Smith ......................... | 277/437 |
| 3,490,986 A | * | 1/1970 | Abrabi ........................ | 428/372 |
| 3,552,755 A | * | 1/1971 | Leonard ..................... | 277/635 |
| 3,791,658 A | * | 2/1974 | Zumeta et al. ............... | 277/537 |
| 3,879,044 A | * | 4/1975 | Estes ........................... | 277/651 |
| 4,559,862 A | * | 12/1985 | Case et al. ....................... | 87/1 |
| 4,619,534 A | * | 10/1986 | Daly et al. .................... | 384/94 |
| 4,700,954 A | * | 10/1987 | Fischer ........................ | 277/342 |
| 5,004,513 A | * | 4/1991 | Bemis et al. ................ | 156/191 |
| 5,028,056 A | * | 7/1991 | Bemis et al. ................ | 277/437 |
| 5,108,820 A | * | 4/1992 | Kaneko et al. ............. | 428/198 |
| 5,256,223 A | * | 10/1993 | Alberts et al. ................ | 156/71 |
| 5,352,518 A | * | 10/1994 | Muramoto et al. ......... | 428/373 |
| 5,540,992 A | * | 7/1996 | Marcher et al. ............ | 442/334 |
| 5,916,954 A | * | 6/1999 | Bohn et al. .................. | 524/494 |
| 6,120,036 A | * | 9/2000 | Kalsi et al. .................. | 277/559 |
| 6,123,337 A | | 9/2000 | Fang et al. | |
| 6,179,296 B1 | * | 1/2001 | Cawthorne et al. ......... | 277/336 |
| 6,225,243 B1 | * | 5/2001 | Austin ......................... | 442/361 |
| 6,270,891 B1 | * | 8/2001 | Maugans et al. ........... | 428/364 |

(Continued)

*Primary Examiner*—Alison K. Pickard
(74) *Attorney, Agent, or Firm*—Jeffer, Mangels, Butler & Marmaro LLP

(57) ABSTRACT

Ordered elastomeric composites comprise an ordered arrangement of a number of first elastomeric phases distributed uniformly within a continuous matrix second elastomeric phase. The second phase can be formed from an elastomeric material that is relatively harder than an elastomeric material that is used to form the first phases. Each first phase can be in the form of a core having a defined length and diameter, and the second phase can be formed from a number of shells that each surround a respective core. In a preferred embodiment, the arrangement of cores and shells are aligned coaxially with one another to provide a cellular structure. Ordered elastomeric composites of this invention can be used to form part of or an entire elastomeric seal, e.g., in the form of an annular ring adapted for use in a rotary cone drill bit.

26 Claims, 5 Drawing Sheets

U.S. PATENT DOCUMENTS

| | | |
|---|---|---|
| 6,406,030 B1 | 6/2002 | Fang et al. |
| 6,517,080 B1 * | 2/2003 | Pressler ..................... 277/440 |
| 6,548,578 B2 * | 4/2003 | Pawlikowski ................ 524/47 |
| 6,677,038 B1 * | 1/2004 | Topolkaraev et al. ....... 428/370 |
| 6,756,445 B1 * | 6/2004 | Irie et al. .................... 525/191 |
| 2003/0012905 A1 * | 1/2003 | Zumbrum et al. ......... 428/36.4 |
| 2003/0113531 A1 * | 6/2003 | Hajmrle et al. ............. 428/327 |

* cited by examiner

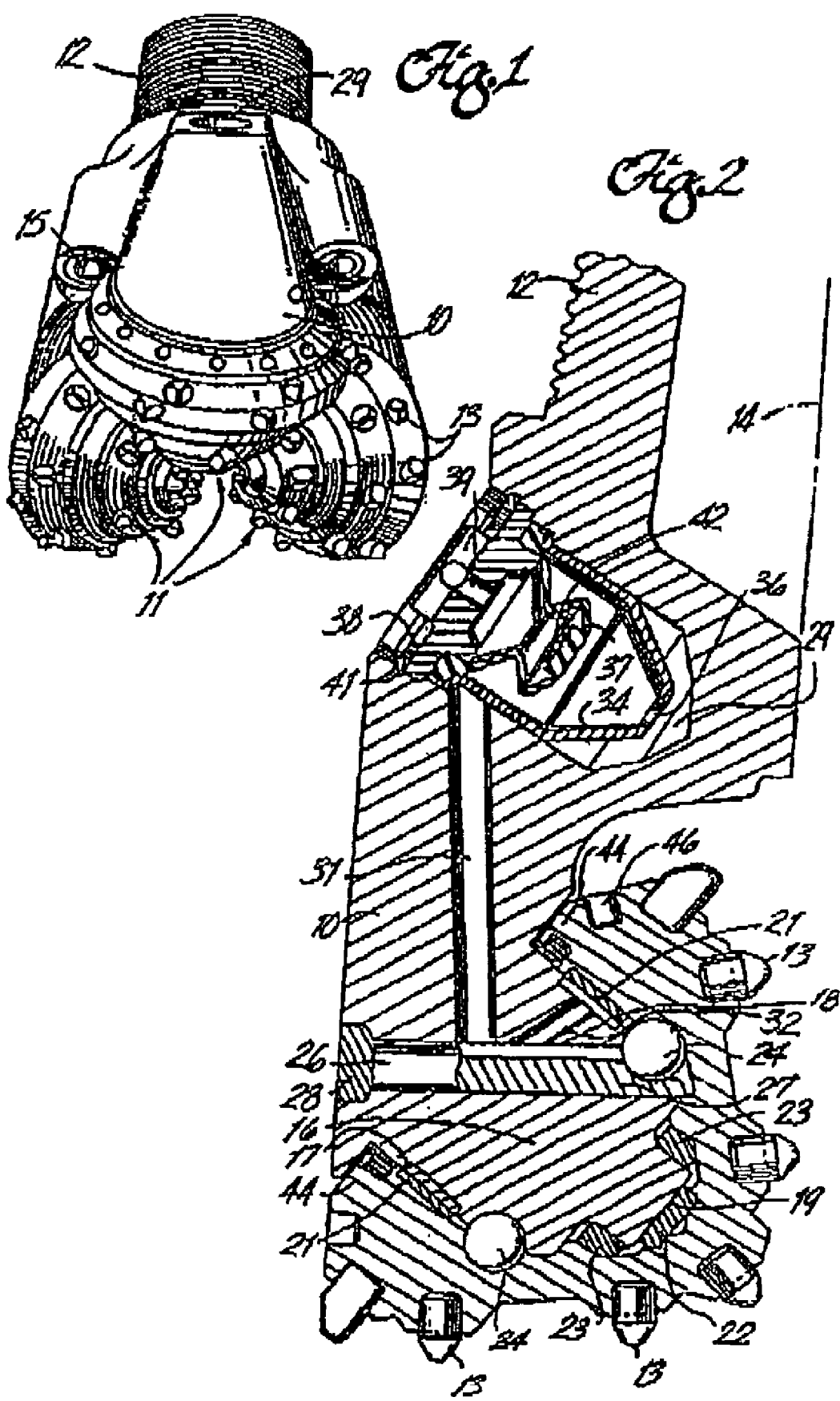

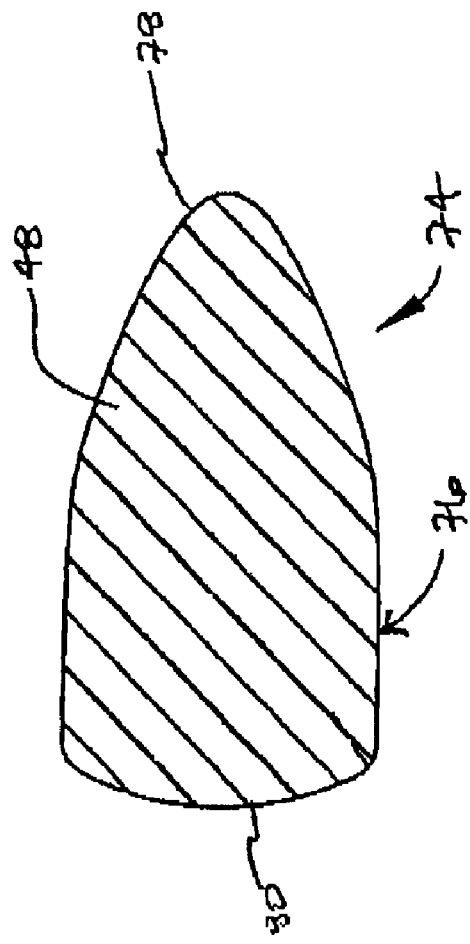
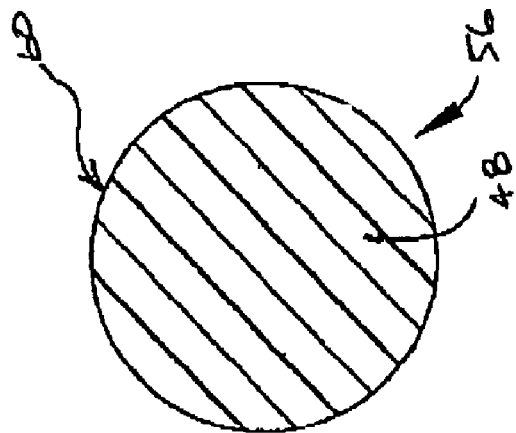
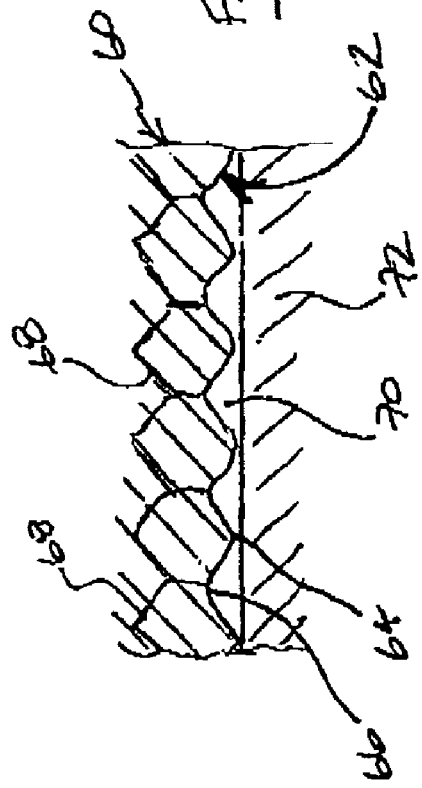

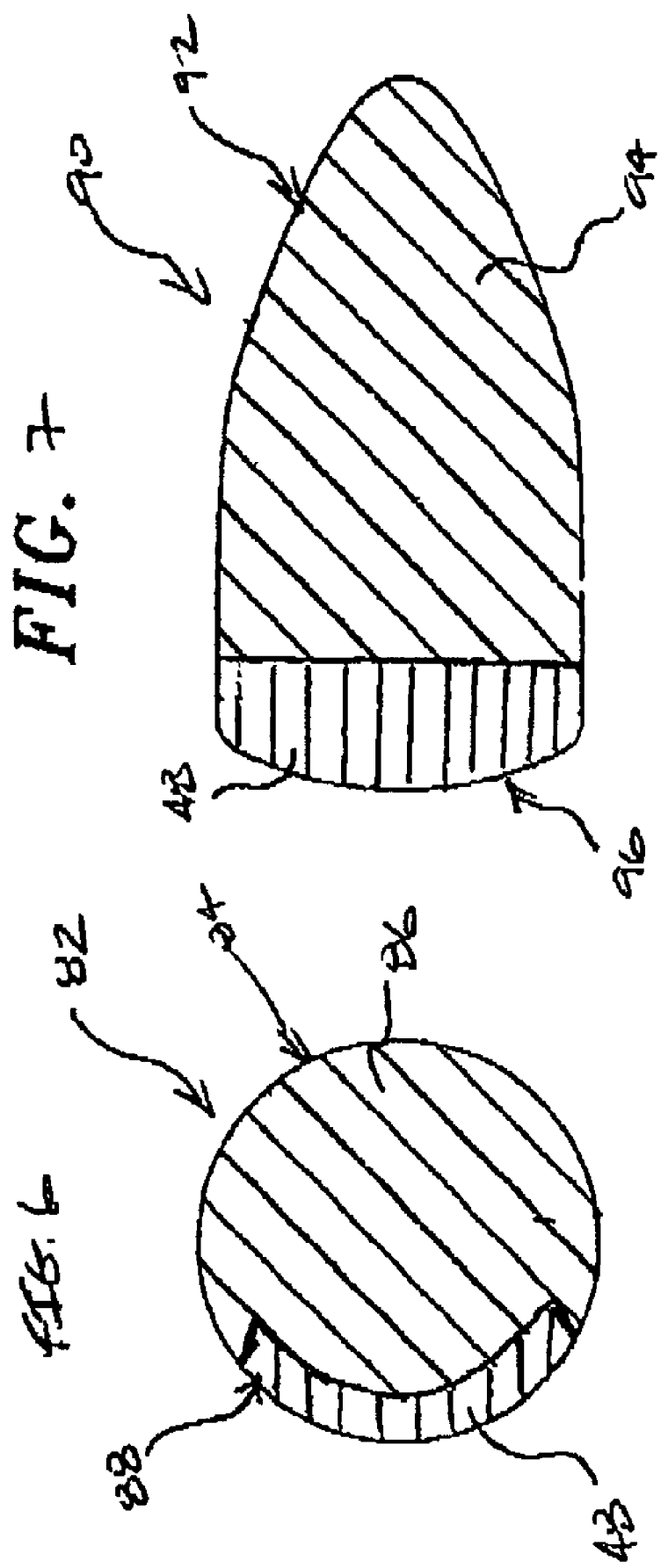

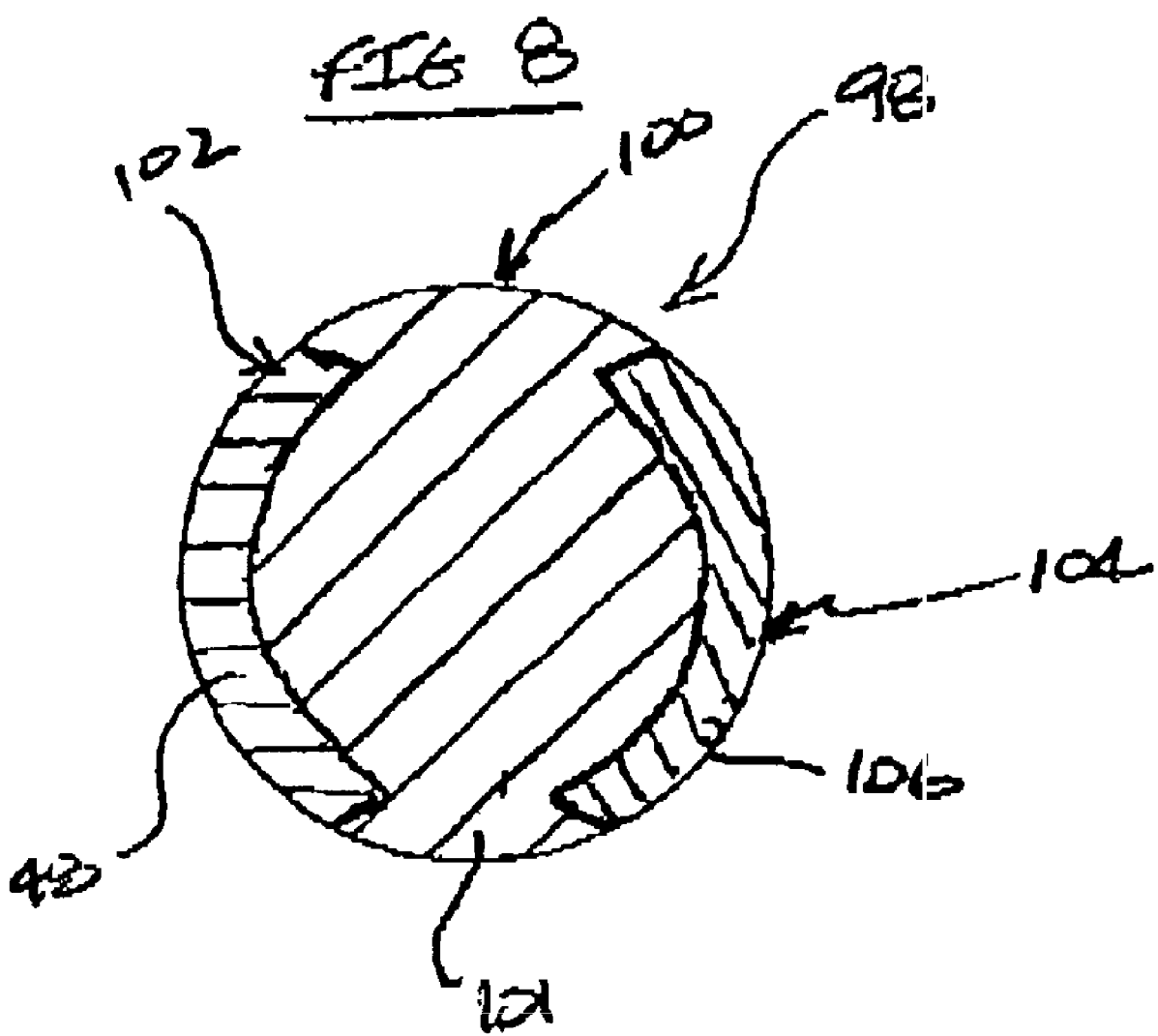

ORDERED ELASTOMERIC COMPOSITE MATERIAL

FIELD OF THE INVENTION

This invention relates to elastomeric materials and, more particularly, to an elastomeric composite useful for constructing an annular seal and having a structure comprising an ordered arrangement of two or more elastomeric material phases designed to provide improved combined performance properties when compared to seals formed from conventional noncomposite elastomeric materials.

BACKGROUND OF THE INVENTION

The use of elastomeric materials in forming seals, e.g., annular ring seals and the like, is well known. It is generally thought useful to use elastomeric materials in such applications because of their inherently resilient nature that operates to provide a self-energizing force when loaded or squeezed into sealing position. This energizing feature operates to urge the seal into sealing contact against an adjacent surface to be sealed.

Elastomeric seals are used for many different applications. When installed in a rotary cone drill bit used for subterranean drilling operations, elastomeric seals are used to prevent grease that is used to lubricate a journal bearing within the bit from escaping. In such application it is desired that the elastomeric seal have a desired modulus of elasticity to provide a desired sealing force against an adjacent sealing surface when the seal is loaded or squeezed within the bit. In such applications, elastomeric seals have proven to be quite useful.

In such drill bit application, it is also necessary for the elastomeric seal to display properties other than and in addition to desired elasticity. Elastomeric seals used in drill bits are called on to provide sealing service in environments that are extremely harsh. Modern drill bits are being run at exceptionally high surface speeds, sometimes more than 500 feet per minute, with cone speeds averaging in the range of from 200 to 400 revolutions per minute. The life of an elastomeric seal in such application may be significantly degraded by high temperatures due to friction (as well as elevated temperature in the well bore) and abrasion. Additionally, such elastomeric seals can be degraded due to exposure with petrochemicals. Thus, in order to provide a consistently reliable elastomeric seal for maintaining the lubricant within the drill bit, it is desired that such seal displaying properties of heat resistance, wear resistance, and chemical resistance, in addition to desired resiliency.

However, the ability to provide an elastomeric seal having a desired level of all such properties is challenging, as these properties are interdependent on one another. Thus, when improved properties of hardness or wear resistance is desired, changing the elastomeric composition to achieve this goal can have a detrimental impact on the elastomeric resilience or modulus of the seal, i.e., increasing hardness or wear resistance will reduce elastomeric resilience or modulus. Because of this challenge, designers have explored different approaches to achieving desired combined properties.

One such approach known in the art involves constructing an elastomeric seal from two or more different elastomeric component, each specifically formulated to provide a certain desired performance property. One example of this approach comprises a annular seal comprising a seal body that is formed from one type of elastomeric material, e.g., one designed to provide a desired degree of resiliency, and a sealing surface along the seal body from another type of elastomeric material, e.g., formed from another type of elastomeric material designed to provide a desired degree of wear resistance or hardness. This type of elastomeric seal is one characterized by two distinctly different types of single-phase elastomers used to form different parts of the seal. While such elastomeric seals have provided some degree of improvement in achieving desired combined properties of resiliency and wear resistance over single elastomeric seals, such seals are still known to suffer from other performance issues common to single elastomeric seals.

A problem known to exist with conventional elastomeric seals is the unwanted build up of thermal energy, i.e., heat, during drill bit operation. This heat can be provided from the external operating environment of the drill bit itself, or by the friction of the elastomeric seal engaged within the bit. It is theorized that thermal energy is allowed to travel freely within such conventional elastomeric seals due to the continuous nature of the elastomeric structure. This is true regardless if the seal is constructed entirely from a single elastomeric material, or whether the sale comprises two or more different segments each constructed from a different elastomeric material.

In either case, such heat is known to build within such conventional elastomeric seals to the point where it can cause the seal to exhibit hysteresis, which causes the seal to lose desired properties of modulus, resiliency, tensile strength, and compression set. This is believed due to the fact that the elastomeric material undergoes vulcanization at the elevated temperature, causing the seal to harden, loose its resiliency, crack, and fail.

It is, therefore, desired that an elastomeric material be engineered in a manner that addresses the issue of unwanted heat build up when used in a sealing application. It is desired that such elastomeric material be constructed in a manner that addresses this issue without sacrificing desired properties of resiliency, wear resistance, chemical resistance, tensile strength, and compression set. It is further desired that such an elastomeric material permit the formation of seals, e.g., useful in drill bit applications, as a retrofit member, i.e., without having to modify the surrounding seal environment.

SUMMARY OF THE INVENTION

Ordered elastomeric composites, constructed according to the principles of this invention, comprise an ordered arrangement of a number of first elastomeric phases distributed uniformly within a continuous matrix second elastomeric phase. In an example embodiment, the second phase is formed from an elastomeric material that is relatively harder than an elastomeric material that is used to form the first phases. Also, each first phase is in the form core having a defined length and diameter, and the second phase is formed from a number of shells that each surround a respective core. In a preferred embodiment, the arrangement of cores and shells are aligned coaxially with one another to provide a cellular structure.

Ordered elastomeric composites of this invention can be used to form part of or an entire elastomeric seal. In an example embodiment, ordered elastomeric composites of this invention are used to form an annular ring-shaped seal adapted for use in a rotary cone drill bit. The elastomeric composite can be positioned along a surface of the seal subjected to frictional wear and/or heat. When used to form such an elastomeric seal, the cellular structures of order elastomeric composites of this invention operates to provide improved properties of heat dissipation without sacrificing desired properties of resiliency, wear resistance, chemical resistance, tensile strength, and compression set, thereby operating to improve the service life of the seal and drill bit when compared to conventional single-elastomer seals.

BRIEF DESCRIPTION OF THE DRAWINGS

These and other features and advantages of the present invention will become appreciated as the same becomes better understood with reference to the drawings wherein:

FIG. 1 is a semi-schematic perspective of a rotary cone bit containing an annular seal formed from an ordered elastomeric composite of this invention;

FIG. 2 is a partial cross-sectional view of the drill bit of FIG. 1;

FIG. 4A is a cross-sectional view of an annular seal, constructed entirely from an ordered elastomeric composite of this invention, having a symmetric axial cross section;

FIG. 4B is a cross-sectional enlarged schematic view of the annular seal of FIG. 4B as loaded into a drill bit;

FIG. 5 is a cross-sectional view of another embodiment of an annular seal, constructed entirely from an ordered elastomeric composite of this invention, having an asymmetric axial cross section;

FIG. 6 is a cross-sectional view of another embodiment annular seal, constructed partially from an ordered elastomeric composite of this invention, having a symmetric axial cross section;

FIG. 7 is a cross-sectional view of another embodiment annular seal, constructed partially from an ordered elastomeric composite of this invention, having an asymmetric axial cross section; and FIG. 8 is a cross-sectional view of still another embodiment annular seal, constructed partially from an ordered elastomeric composite of this invention, having a symmetric axial cross section.

DETAILED DESCRIPTION

Figure 3:
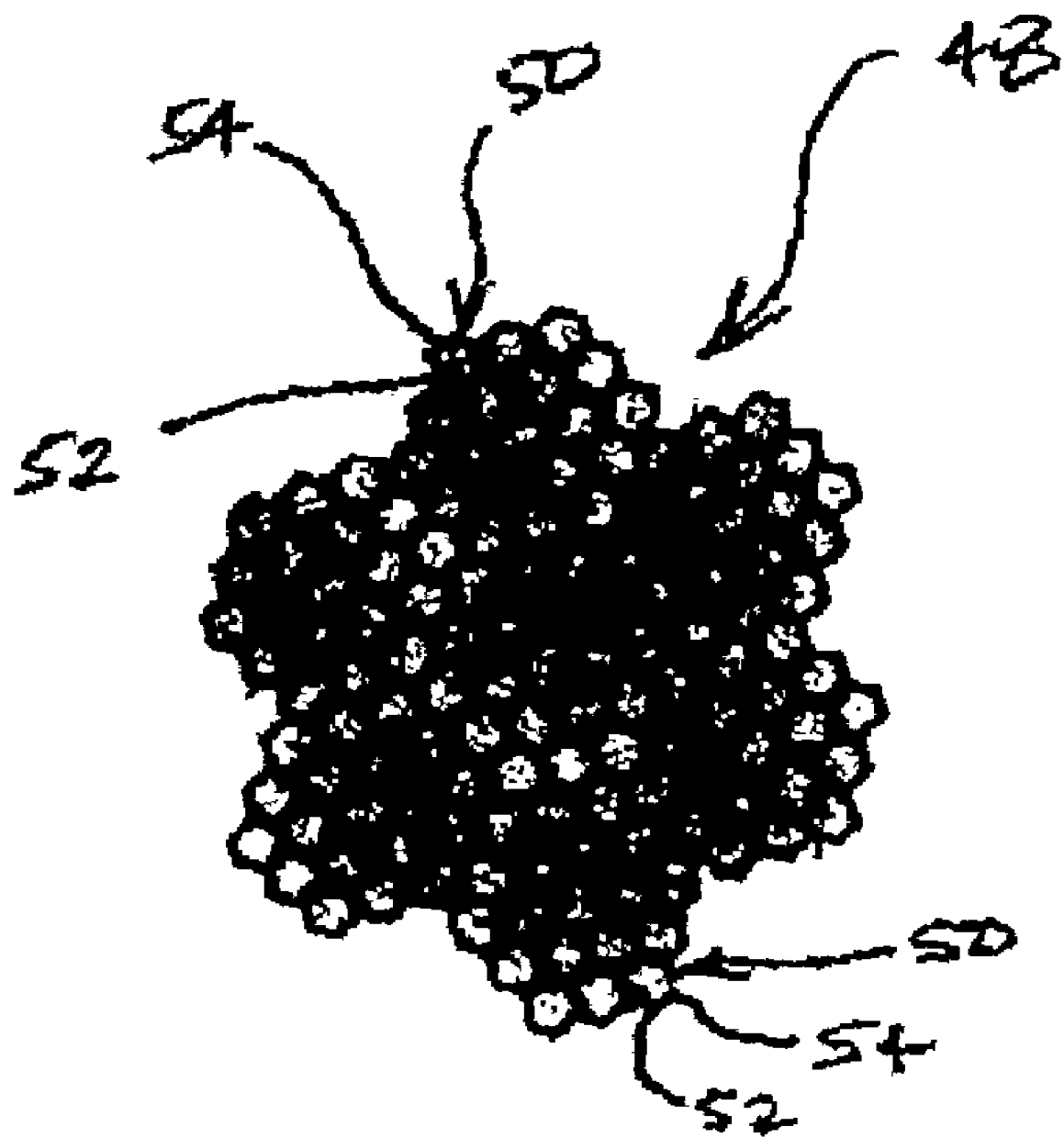
FIG. 3 is a cross-sectional view of a section of an ordered elastomeric composite of this invention illustrating a cellular structure.

Elastomeric composites, prepared according to principles of this invention, comprise two or more phases of elastomeric materials that are arranged with one another in an ordered manner. In an example embodiment, ordered elastomeric composites of this invention have a cellular structure comprising a number of first phases distributed within a continuous matrix second phase, wherein the first and second phases are each formed from different elastomeric materials. As used herein, the term "different" is intended to refer to the fact that the elastomeric materials are not identical, which can be due to the use of different elastomeric polymers and/or different additives.

A drill bit, e.g., a rock bit, employing an annular seal constructed according to principles of this invention comprises a body 10 having three cutter cones 11 mounted on its lower end, as shown in FIG. 1. A threaded pin 12 is at the upper end of the body for assembly of the bit onto a drill string for drilling oil wells or the like. A plurality of tungsten carbide inserts 13 are pressed into holes in the surfaces of the cutter cones for bearing on the rock formation being drilled. Nozzles 15 in the bit body introduce drilling fluid into the space around the cutter cones for cooling and carrying away formation chips drilled by the bit.

Annular seals are generally thought of as comprising a cylindrical inside and outside diameter, and a circular cross section. Accordingly, for purposes of reference and clarity, some of the figures used to describe the principles and embodiments of this invention have been created to illustrate an O-ring seal having a generally circular cross section. However, the principles of this invention are also meant to apply to annular seals having non-circular cross sections. Such annular seals can be configured having either symmetric or asymmetric non-circular cross sections. It is therefore, to be understood that the principles of this invention may apply to annular seals having circular or non-circular cross sections.

FIG. 2 is a fragmentary, longitudinal cross-section of the drill bit, extending radially from the rotational axis 14 of the rock bit through one of the three legs on which the cutter cones 11 are mounted. Each leg includes a journal pin extending downwardly and radially, inwardly on the rock bit body. The journal pin includes a cylindrical bearing surface having a hard metal insert 17 on a lower portion of the journal pin. The hard metal insert is typically a cobalt or iron-based alloy welded in place in a groove on the journal leg and having a substantially greater hardness than that of the steel forming the journal pin and rock bit body.

An open groove 18 is provided on the upper portion of the journal pin. Such a groove may, for example, extend around 60 percent or so of the circumference of the journal pin, and the hard metal insert 17 can extend around the remaining 40 percent or so. The journal pin also has a cylindrical nose 19 at its lower end.

Each cutter cone 11 is in the form of a hollow, generally conical steel body having cemented tungsten carbide inserts 13 pressed into holes on the external surface. For long life, the inserts may be tipped with a polycrystalline diamond layer. Such tungsten carbide inserts provide the drilling action by engaging a subterranean rock formation as the drill bit is rotated. Some types of bits have hard-faced steel teeth milled on the outside of the cone instead of carbide inserts.

The cavity in the cone contains a cylindrical bearing surface including an aluminum bronze insert 21 deposited in a groove in the steel of the cone or as a floating insert in a groove in the cone. The aluminum bronze insert 21 in the cone engages the hard metal insert 17 on the leg and provides the main bearing surface for the cone on the bit body. A nose button 22 is between the end of the cavity in the cone and the nose 19 and carries the principal thrust loads of the cone on the journal pin. A bushing 23 surrounds the nose and provides additional bearing surface between the cone and journal pin. Other types of bits, particularly for higher rotational speed applications, have roller bearings instead of the journal bearings illustrated herein. It is to be understood that annular seals constructed according to principles of this invention may be used with drill bits comprising either roller bearings or conventional journal bearings.

A plurality of bearing balls 24 are fitted into complementary ball races in the cone and on the journal pin. These balls are inserted through a ball passage 26, which extends through the journal pin between the bearing races and the exterior of the rock bit. A cone is first fitted on the journal pin, and then the bearing balls 24 are inserted through the ball passage. The balls carry any thrust loads tending to remove the cone from the journal pin and thereby retain the cone on the journal pin. The balls are retained in the races by a ball retainer 27 inserted through the ball passage 26 after the balls are in place. A plug 28, is then welded into the end of the ball passage to keep the ball retainer in place.

The bearing surfaces between the journal pin and the cone are lubricated by a grease. Preferably, the interior of the rock bit is evacuated, and grease is introduced through a fill passage (not shown). The grease thus fills the regions adjacent the bearing surfaces plus various passages and a grease reservoir, and air is essentially excluded from the interior of the rock bit. The grease reservoir comprises a cavity 29 in the rock bit body, which is connected to the ball passage 26 by a lubricant passage 31. Grease also fills the portion of the ball passage adjacent the ball retainer, the open groove 18 on the upper side of the journal pin and a diagonally extending passage 32 therebetween. Grease is retained in the bearing structure by a resilient seal in the form of an annular ring 44 between the cone and journal pin.

A pressure compensation subassembly is included in the grease reservoir 29. The subassembly comprises a metal cup 34 with an opening 36 at its inner end. A flexible rubber bellows 37 extends into the cup from its outer end. The bellows is held into place by a cap 38 with a vent passage 39. The pressure compensation subassembly is held in the grease reservoir by a snap ring 41.

When the rock bit is filled with grease, the bearings, the groove 18 on the journal pin, passages in the journal pin, the lubrication passage 31, and the grease reservoir on the outside of the bellows 37 are filled with grease. If the volume of grease expands due to heating, for example, the bellows 37 is compressed to provide additional volume in the sealed grease system, thereby preventing accumulation of excessive pressures. High pressure in the grease system can damage the annular seal 44 and permit drilling fluid or the like to enter the bearings. Such material is abrasive and can quickly damage the bearings.

Conversely, if the grease volume should contract, the bellows can expand to prevent low pressures in the sealed grease system, which could cause flow of abrasive and/or corrosive substances past the annular seal. The bellows has a boss 42 at its inner end, which can seat against the cap 38 at one end of the displacement of the bellows for sealing the vent passage 39. The end of the bellows can also seat against the cup 34 at the other end of its stroke, thereby sealing the opening 36.

If desired, a pressure relief check valve can also be provided in the grease reservoir for relieving over-pressures in the grease system that could damage the annular seal. Even with a pressure compensator, it is believed that occasional differential pressures may exist across the annular ring seal of up to 150 psi (550 kilopascals). To maintain the desired properties of the annular seal at the pressure and temperature conditions that prevail in a rock bit, to inhibit "pumping" of the grease through the annular seal, and for a long useful life, it is important that the annular seal be resistant to crude gasoline and other chemical compositions found within oil wells, have a high heat and abrasion resistance, have low rubbing friction, and not be readily deformed under the pressure and temperature conditions in a well which could allow leakage of the grease from within the bit or drilling mud into the bit.

Although annular seals of this invention are illustrated as being used in drill bits designed to accommodate a single seal, it is to be understood that annular seals of this invention are equally intended to be used in drill bits using multiple ring seals, e.g., as a primary and/or secondary seal in a dual-seal drill bit.

Referring to FIG. 3, an example embodiment of an ordered elastomeric composite 48 of this invention comprises an ordered arrangement of two or more different elastomeric phases made up of a number of repeating individual structural units 50. In a preferred embodiment, each structural unit 50 includes an inner core portion 52 that is surrounded by a corresponding outer shell portion 54. The core 52 is made from a first elastomeric material, and the shell 54 surrounding the core is made from a second elastomeric material. It is generally desired that the core and shell each be formed from elastomeric materials having certain different desired mechanical and/or chemical properties.

For example, in a preferred embodiment, the core 52 is formed from an elastomeric material having a desired property of resiliency or modulus to provide a desired energizing function to the elastomeric composite, and the shell 54 is formed from an elastomeric material having a desired property of hardness, and/or a low surface friction to provide a desired wear/abrasion and/or heat resistant function, e.g., to an annular seal comprising the same.

Example elastomeric materials useful for forming the core portion of elastomeric composite structural units of this invention include relatively soft, i.e., low durometer hardness, rubber or elastomeric materials having a relatively high coefficient of friction, and that are capable of being deflected and squeezed. These elastomeric materials enable each core portion of the many ordered structural units to act as an energizer within the elastomeric composite when loaded within a drill bit seal gland to transfer a desired loading force to a sealing portion of an annular seal formed from the elastomeric composite. This loading force operates to produce a desired amount of contact pressure between the annular seal and an adjacent surface of the drill bit, e.g., an adjacent journal bearing surface, to provide a desired leak-tight seal therebetween.

Suitable rubber materials useful for forming the core portion 52 include those selected from the family of nitrile-butadiene rubber (NBR) and highly saturated nitrile-butadiene rubbers (HNBR), ethylene-propylene-diene terpolymers (EPDM), fluoroelastomers, and styrene-Butadiene Rubber (SBR). It is preferred that such rubber or elastomeric materials have a durometer Shore A hardness measurement in the range of from about 60 to 80, and preferably less than about 75. Preferred materials for forming the core have a modulus of elasticity at 100 percent elongation of between about 2,700 to 5,000 kilopascals, elongation of from about 200 to 1,000 percent, a minimum tensile strength of from about 7,000 to 28,000 kilopascals, and a compression set after 70 hours at 100° C. in the range of from about 5 to 18 percent.

A preferred elastomeric material useful for forming the core portion of elastomeric composite structural units of this invention is HSN that has a durometer Shore A hardness measurement in the range of from about 73 to 78, a modulus of elasticity at 100 percent elongation of between about 3,500 to 4,200 kilopascals, elongation of from about 300 to 400 percent, a minimum tensile strength of approximately 27,000 kilopascals, and a compression set after 70 hours at 100° C. of approximately 14 percent.

Suitable elastomeric materials useful for forming the shell portion of the multiplicity of structural units include rubber and elastomeric materials selected from the group comprising carboxylated nitrites, NBR elastomers, HNBR elastomers, any of the fluropolymeric materials, and the like that have a modulus of elasticity at 100 percent elongation of greater than about 4,500 kilopascals, and that have a standard compression set after 70 hours at 100° C. of less than about 30 percent.

Preferred elastomeric materials useful for forming the shell portion include those having a durometer Shore A hardness measurement in the range of from about 75 to 95, and more preferably greater than about 80. Preferred elastomeric materials for forming the shell portion have a modulus of elasticity at 100 percent elongation of in the range of from about 700 to 2,000 psi, elongation of from about 100 to 400 percent, a tensile strength of in the range of from about 1,500 and 4,000 psi, and a compression set after 70 hours at 100° C. in the range of from about 8 to 30 percent. The use of relatively harder rubber or elastomeric materials are preferred to form the shell portion of the composite because they provide desired characteristics of abrasion and wear resistance, and are also more stable under high temperature conditions.

Additionally, using a relatively harder rubber or elastomeric material for forming the shell reduces friction torque and minimizes stick slip, when the elastomeric composite is formed into an annular seal positioned within a drill bit adjacent a dynamic sealing surface, thereby resulting in less adhesive wear and less heat generation at the dynamic surface of the seal. Elastomeric materials having these properties provide the desired degree of hardness, wear resistance, abrasion resistance, friction resistance, and temperature stability to provide a desired degree of enhanced performance, thereby extending the service life of the bit.

The rubber or elastomeric materials selected to form the shell portion of the structural units can also include one or more reinforcing or lubricating additive for the purpose of providing further physical stability and/or reduced surface friction to annular seals formed therefrom. Suitable lubricating materials include those selected from the group including polytetrafluoroethylene (PTFE), hexagonal boron nitride (hBN), graphite, molybdenum disulfide, thermoplastic polymers such as high-density polyethylene and polypropylene, and other commonly known fluoropolymeric, dry or polymeric lubricants, and mixtures thereof. The lubricant additive is used to provide an added degree of low friction and wear resistance to the elastomeric component of the composite material that is placed in contact with a rotating surface.

It has been discovered that boron nitride (provided as hexagonal boron nitride) or graphite can be used as a partial substitute for carbon black to provide strength to the elastomeric material, to reduce the coefficient of friction of the elastomeric material, and to reduce the amount of abrasive wear that is caused by the elastomeric material, i.e., to make the a seal formed from the composite less abrasive against the mating journal bearing surface. Elastomeric materials comprising lubricant additives useful for forming the shell portion include those disclosed in U.S. Pat. No. 6,406,030, which is hereby incorporated by reference.

If desired, the rubber or elastomeric materials selected to form the shell portion can also include a nonelastomeric component in the form of fibers such as those selected from the group consisting of polyester fiber, cotton fiber, aromatic polyamines (Aramids) such as those available under the Kevlar family of compounds, polybenzimidazole (PBI) fiber, poly m-phenylene isophthalamide fiber such as those available under the Nomex family of compounds, and mixtures or blends thereof. The fibers can either be used in their independent state and combined with an elastomeric composite component, or may be combined into threads or woven into fabrics with an elastomeric composite component.

Other useful nonelastomeric components include those that display properties of high-temperature stability and endurance, wear resistance. If desired, glass fiber can be used to strengthen the polymeric fiber, in such case constituting the core for the polymeric fiber. Elastomeric materials comprising nonelastomeric components useful for forming the shell portion include those disclosed in U.S. Pat. No. 6,123,337, which is hereby incorporated by reference.

A particularly preferred HSN elastomer useful for forming the shell portion has a durometer Shore A hardness measurement in the range of from about 77 to 84, a modulus of elasticity at 100 percent elongation of in the range of from about 5,500 to 8,700 kilopascals, elongation in the range of from about 150 to 400 percent, a tensile strength in the range of from about 7,000 to 31,000 kilopascals, and a compression set after 70 hours at 100° C. of less than about 18 percent.

Referring still to FIG. 3, the individual structural units 50 are arranged/assembled with one another in an ordered fashion to form the elastomeric composite. The structural units can each have a number of different geometric shapes, with reference to a cross-sectional view. For example, the units can have a circular or non-circular cross-sectional shape. In an example embodiment, each structural unit can be shaped having a honeycomb or hexagonal configuration for the purpose of providing efficient packing together to form the overall ordered elastomeric composite.

In this example, the elastomeric composite is characterized as having cellular structure formed from the co-axially ordered arrangement of the many structural units. The cellular structure comprises a number of first elastomeric material phases, in the form of the cores, that are uniformly distributed within a continuous matrix second elastomeric material phase, in the form of connected together shells. It is to be understood that the exact geometric shape of the structural units that are used to form ordered elastomeric composites of this invention can vary depending on the particular size of the annular seal to be formed, the location of placement in the annular seal, and the particular annular seal application.

Ordered elastomeric composites of this invention can be used to form one or more portions of an annular seal, or the entire annular seal itself, depending on the particular seal application. FIG. 4A illustrates an example annular seal 56 formed from the ordered elastomeric composite 48 of this invention. This example annular seal comprises a body 58 shaped having a symmetric axial cross section, e.g., having a circular cross-sectional shape in the form of an O-ring. In this particular example, the entire annular seal is formed from the ordered elastomeric composite.

In a preferred embodiment, the annular seal is formed so that the ordered arrangement of multiple structural units runs circumferentially within the seal body, i.e., such that a cross-section taken axially through the seal body (as illustrated in FIG. 4A) illustrates the cellular structure comprising the plurality of cores and shells as illustrated in FIG. 3. Annular seals constructed in this manner comprise an outside surface that is defined by a plurality of shells. This arrangement is desired because the relatively harder and more wear resistant surface of the plurality of shells operates to better equip the seal body for use within the drill bit.

A further advantage of this particular configuration is that the multiplicity of shells defining the seal outside surface provide a surface feature that is not smooth, but rather one that is characterized by a plurality of angular peaks and valleys. As illustrated in FIG. 4B, in greatly exploded detail for purposes of reference, the seal body includes an exterior surface 62 characterized by a multiplicity of peaks 64 and valleys 66 provided by the plurality of shells 68. This surface geometry is advantageous as it operates to provide a plurality of pockets or channels, defined by the valleys 66, that are useful for retaining lubricant 70 along the seal surface when the seal body is loaded against an adjacent rock bit sealing surface, e.g., a seal gland surface. This ability to retain lubricant along the seal surface is desired as it helps to reduce unwanted friction, and the resulting generation of heat, during bit operation.

Alternatively, the annular seal can be formed so that the ordered arrangement of multiple structural units runs radially within the seal body, i.e., such that the plurality of cores and shells extend radially outwardly from the seal inside and outside diameter surfaces. This particular embodiment may be useful in reducing pitting damage to the seal gland.

FIG. 5 illustrates another example annular seal 74 formed from the ordered elastomeric composite 48 of this invention. This example annular seal comprises a body 76 shaped having an asymmetric axial cross section, e.g., having a outer diameter that is shaped differently than an inner diameter. Again, as with the seal embodiment illustrated in FIG. 4A, the entire annular seal is formed from the ordered elastomeric composite, and the outer diameter 78 is shaped having a radius of curvature that is less than that of the outer diameter 80.

The annular seal 74 is preferably constructed so that the ordered arrangement of multiple structural units runs circumferentially within the seal body, i.e., such that a cross-section taken axially through the seal body. Alternatively, the annular seal can be formed so that the ordered arrangement of multiple structural units runs radially within the seal body, i.e., such that plurality of cores and shells extend between the seal inside and outside diameter surfaces.

FIG. 6 illustrates another embodiment annular seal 82 that is somewhat similar to that disclosed above and illustrated in FIG. 4A, in that both seals have a seal body 84 characterized by a symmetric axial cross section. Unlike the seal of FIG. 4A, however, this annular seal is only partially formed from the ordered elastomeric composite of this invention. Specifically, the seal 82 includes a seal body 84 primarily formed from a conventional single phase elastomeric material 86, but including a section 88 that is formed from the ordered elastomeric composite 48 of this invention. The conventional elastomeric materials useful for forming the seal body can include those materials discussed above for forming the core portion of the structural units, for the purpose of providing an energizing function to the seal.

Section 88, can be provided along a portion of the seal exposed to friction and frictional heat, e.g., along a seal surface positioned in dynamic contact with a drill bit sealing surface. In an example embodiment, where the annular seal is configured such that an inside diameter is in dynamic rotary contact with a drill bit sealing surface, at least a portion of the inside diameter surface is formed from the ordered elastomeric composite. As noted above, the ordered elastomeric composite can be oriented such that the plurality of structural units run circumferentially around the inside diameter portion of the seal. Alternatively, the structural units can be oriented radially within the seal such that the plurality of structural units extend radially from the inside diameter surface a distance into the seal body.

FIG. 7 illustrates another embodiment annular seal 90 that is somewhat similar to that disclosed above and illustrated in FIG. 5, in that both seals have a seal body 92 characterized by an asymmetric axial cross section. Unlike the seal of FIG. 5, however, this annular seal is only partially formed from the ordered elastomeric composite of this invention. Specifically, this example seal includes a seal body 92 that is primarily formed from a conventional elastomeric material 94, but that includes a section 96 formed from the ordered elastomeric composite 48 of this invention. The conventional elastomeric materials useful for forming the seal body can include those materials discussed above for forming the core portion of the structural units, for the purpose of providing an energizing function to the seal.

Section 88, can be provided along a portion of the seal exposed to friction and frictional heat, e.g., along a seal surface positioned in dynamic contact with a drill bit sealing surface. In an example embodiment, where the annular seal is configured such that an inside diameter is in dynamic rotary contact with a drill bit sealing surface, at least a portion of the inside diameter surface is formed from the ordered elastomeric composite. As noted above, the ordered elastomeric composite can be oriented such that the plurality of structural units run circumferentially around the inside diameter portion of the seal. Alternatively, the structural units can be oriented radially within the seal such that the plurality of structural units extend radially from the inside diameter surface a distance into the seal body.

In the case where ordered elastomeric composites of this invention are only used to form a selected portion of the annular seal, the exact location of placement of the composite will vary depending on such factors as seal size, drill bit configuration, and drill bit application. For example, in certain applications it may desirable to form the dynamic sealing surface of the seal, and/or a portion of the adjacent axial side surfaces of the seal (e.g., the mud side and the grease side) with the ordered elastomeric composite for the combined purposes of helping to control wear resistance and frictional heat (at the dynamic sealing surface) and protect the seal from pressure and abrasive affects (at the side edges due to pressure differentials within the seal and exposure to drilling mud and debris). It is, therefore, to be understood, that elastomeric composites of this invention can be used to form any number of different seal sections portions as called for by the seal particular application.

Ordered elastomeric composites of this invention are made in the following manner. Desired materials selected to form the core and shell portions of each structural unit are loaded into a coextruder, which operates to simultaneously form the core and shell portions of a number of structural units or cells. The so-formed structural cells produced by the coextruder are oriented together with one another in coaxial fashion and loaded into a die that operates to form a bundle from the combined cells. This bundle can be twisted if desired for the purpose of reducing contact sealing force.

In the case where the entire seal is formed from the ordered elastomeric composite, the so-formed bundle of structural units is then loaded into a compression mold having the approximate configuration of the completed seal, and the cells forming the bundle are vulcanized together to form a unitary seal construction characterized having a cellular structure comprising a plurality of core portions separated from one another by a matrix of connecting shells. In the case where only a portion of the seal is formed form the ordered elastomeric composite, the so-formed bundle is loaded together with a remaining portion of the seal body into the compression mold. The bundle and remaining portion of the seal body are covulcanized to form a unitary seal construction. Suitable adhesives useful for promoting bonding between the two seal assemblies include CHEMLOCK 252, manufactured by Lord Corp. To facilitate good covulcanization between the bundle and the remaining seal body, it is desired that the elastomeric materials selected to form the same be chemically compatible.

FIG. 8 illustrates a still other embodiment annular seal 98 that is somewhat similar to that disclosed above and illustrated in FIG. 6, in that both seals include a seal body formed from an elastomeric material, and a portion of the seal formed from the elastomeric composite of this invention. This particular annular seal comprises a seal body 100 that is formed from an elastomeric material 101, a first seal body portion 102 formed from the elastomeric composite 48 of this invention, and a second seal body portion 104 formed from another elastomeric material 106. This seal embodiment illustrates the use of the elastomeric composites of this invention in forming one portion of a composite annular seal, i.e., an annular seal comprising different material sections.

In an example embodiment, the seal body 100 is preferably formed from an elastomeric material capable of providing a desired level of resiliency for energizing the seal when loaded into the drill bit. The first seal body portion 102 comprises a surface section of the seal that is exposed to dynamic contact with a drill bit surface. Thus, the elastomeric composite of this invention operates to provide desired properties of improved wear and abrasion resistance, in addition to improved thermal control, when compared to the seal body. The second seal body portion 104 comprises a surface section of the seal that is exposed to relatively static contact with a drill bit surface. Thus, the elastomeric material 106 that is selected for this application is preferably one that is relatively softer than that of the elastomeric composite for the purpose of engaging and maintaining contact with the drill bit surface.

While particular example embodiments disclosing and illustrating how elastomeric composites of this invention can be used to form annular seals for use in a drill bit, it is to be understood that many other example applications within the intent of this invention are possible. It is to be understood that elastomeric composites of this invention can be used to form an entire annular seal, or any portion of the seal where improved properties of heat resistance, abrasion and wear resistance, hardness, and/or resistance to extrusion forces is desired. This, the elastomeric composite of this invention can be used to provide full or partial sealing surfaces, and/or full or partial seal surfaces exposed to possible extrusion forces.

While elastomeric composites useful for constructing annular seals have been specifically described above and illustrated, the following example is provided for better understanding a preferred invention embodiment.

EXAMPLE

An annular seal comprising an ordered elastomeric composite is prepared in the following manner. An elastomeric material selected for forming the core portion of the elastomeric composite is prepared by combining the following ingredients as measured in parts by weight:

| | |
|---|---|
| HNBR: | 100.00 |
| Carbon black: | 20–60 |
| Process aids/plasticizers: | 1.5–15 |
| Antioxidants/antiozonants: | 1–10 |
| Vulcanization materials: | 4–20 |

An elastomeric material selected for forming the shell portion of the elastomeric composite is prepared by combining the following ingredients as measured in parts by weight:

| | |
|---|---|
| HNBR: | 100.00 |
| Carbon black: | 20–100 |
| Antioxidants: | 1.5–15 |
| Internal lubricants: | 8–70 |
| Plasticizer: | 2–20 |
| Vulcanization materials: | 4–20 |

The elastomeric materials for the core and shell are fed to a coextruder that is configured to output at least one structural unit comprising a core surrounded by a shell. The coextruder is operated under normal production conditions. Each structural unit that is produced by the coextruder is generally hexagonal in configuration, wherein each core has an outside diameter (as measured between diametrically-opposed flat surfaces) of approximately 2.28 millimeters (mm), and each shell has a wall thickness of approximately 0.254 mm. Thus, the total diameter of the structural unit is approximately 2.79 mm.

Approximately three structural units were assembled together in parallel with one another and placed into an extrusion chamber fitted with a plunger type ram. The apparatus is equipped with a die head that operates to form an extrudate bundle. The bundle has a diameter of approximately 7.62 mm. At this stage of the construction process, the bundle of arranged structural units forms a cellular structure comprising a plurality of cores that are each separated by shells.

The so-formed bundle is loaded into a compression mold that is sized and shaped in the approximate size and shape of the desired annular seal. In an example embodiment, the desired seal has a cross-sectional thickness of approximately 6.35 mm. The compression mold is operated at a temperature of approximately 350° F. for 25 minutes followed by a three hour post cure. The shells in the compressed bundle are vulcanized to provide a true cellular structure comprising, in this example, three of cores distributed within a continuous matrix of vulcanized shells. The part is removed from the compression mold and trimmed as necessary for final use as an annular seal.

Ordered elastomeric composites of this invention are specially designed having a specifically engineered cellular structure comprising a number of first phases, formed from one elastomeric material, that are uniformly distributed within a continuous matrix second phase, formed from another elastomeric material. Such elastomeric composites are specifically designed to help address unwanted thermal effects that are known to occur in single-phase elastomeric materials.

When used within a drill bit, annular seals having a single phase elastomeric construction are known to lose desired performance properties of hardness, modulus, tensile strength, and compression set when exposed to thermal energy, i.e., heat, inherent within a drill bit. It is theorized that this is due to the generally continuous structure of elastomeric material, which provides relatively little resistance to the transmission of thermal energy by conduction mechanism. Eventually, if allowed to build, the thermal energy will cause the single-phase elastomeric construction to exhibit hysteresis, which is believed due to vulcanization and which causes the seal to lose its desired seal properties are lost. Ultimately, this cases a seal formed from such single phase elastomeric material to loose its resiliency, crack, and fail.

In contrast, elastomeric composites of this invention are intentionally engineered having a cellular structure, e.g., a nonsingle-phase construction, that operates to help reduce the transmission of thermal energy therein. Specifically, it is theorized that the distinct elastomeric phases provided by the cellular structure operates to detour and deflect the path of thermal energy transmission, thereby reducing the extent to which thermal energy is permitted to travel and build within the composite. This thermal energy deflection structure serves to protect the elastomeric composite from the unwanted effects of built up heat. Thus, annular seals having a construction comprising elastomeric composites of this invention are known to provide retained desired properties of modulus, hardness, tensile strength, and compression set when exposed to heat inherent in a drill bit, thereby increasing the service life of the seal and the drill bit.

Although the present invention has been described with considerable detail with reference to certain preferred variations thereof, other variations are possible. Therefore, the spirit and scope of the appended claims should not be limited to the preferred variations described herein.

What is claimed is:

1. A rotary cone drill bit comprising:
    a body having at least one leg extending therefrom;
    cutting cones rotatably disposed on an end of the leg; and
    an elastomeric annular seal interposed between the cutting cone and leg in a seal gland, the seal having a seal body with a sealing surface contacting an adjacent drill bit surface, wherein at least a portion of the seal body includes an elastomeric composite construction comprising a cellular structure of a plurality of oriented first phases formed from a first elastomeric material, that are each in contact with and surrounded by a continuous matrix second phase formed from a second elastomeric material, wherein the second elastomeric material is relatively harder than the first elastomeric material, wherein the first phases are in the form of cores having an axial length and arranged radially adjacent to one another, wherein the first phases are oriented axially in parallel with one another, and wherein the second phase is formed from a combination of plurality of shells that each surround a respective core.

2. The drill bit as recited in claim 1 wherein the seal cores are commonly oriented to extend circumferentially within the seal body.

3. The drill bit as recited in claim 1 wherein the seal cores are commonly oriented to extend radially within the seal body.

4. The drill bit as recited in claim 1 wherein the composite construction is positioned at least along a portion of the seal sealing surface.

5. The drill bit as recited in claim 1 wherein the entire seal body is formed from the composite construction.

6. A rotary cone drill bit comprising:
    a body having at least one leg extending therefrom;
    cutting cones rotatably disposed on an end of the leg; and
    an elastomeric annular seal interposed between the cutting cone and leg in a seal gland, the seal having a seal body with a sealing surface contacting an adjacent drill bit surface, wherein at least a portion of the seal body includes an elastomeric composite construction formed by making a plurality of first elastomeric phases and surrounding each of the first elastomeric phases with a second elastomeric phase to form a number of structural units, and then combining the structural units together so that the plurality of the first phases are aligned with one another and the second elastomeric phases are in contact with one another to thereby form a cellular structure of the first and second elastomeric phases, wherein the second elastomeric phase is relatively harder then the first elastomeric phases.

7. The drill bit as recited in claim 6 wherein the first phases are in the form of cores and are oriented axially to extend circumferentially within the seal body so that a portion of the seal sealing surface is formed from the second phase.

8. The drill bit as recited in claim 7 wherein a cross section of the cellular structure is characterized by the plurality of cores having a hexagonal geometry.

9. The drill bit as recited in claim 7 wherein the sealing surface has a surface feature defined by a number of repeated peaks and valleys.

10. The drill bit as recited in claim 6 wherein the cores are commonly oriented to extend radially within the seal body.

11. The drill bit as recited in claim 6, wherein the seal body is formed from a single-phase elastomer, and wherein the elastomeric composite construction is positioned at least along the seal a sealing surface.

12. The drill bit as recited in claim 11 wherein the entire seal body is formed from the elastomeric composite construction.

13. An elastomeric seal for use in a rotary cone drill bit the seal comprising:
    an annular seal body; and
    at least one sealing surface disposed along a section of the body;
    wherein at least a portion of the sealing surface includes an elastomeric composite construction comprising a plurality of first elastomeric phases distributed uniformly within a continuous matrix second elastomeric phase, wherein the elastomeric material used to form the plurality of first phases has a hardness that is relatively less than that that of the elastomeric material that is used to form the second phase, wherein each first phase is in the form of a core having a defined length and diameter, wherein the second phase is formed from a plurality of combined shells that each surround and contact a respective core, and wherein the cores are arranged radially adjacent one another and each extend axially parallel with one so that the composite construction has a cellular structure of cores separated by shells.

14. The elastomeric seal as recited in claim 13 wherein the arrangement of cores is oriented axially to extend circumferentially within the seal so that a sealing surface of the seal is formed from the second phase.

15. The elastomeric seal as recited in claim 13 wherein a cross section of the cellular structure is characterized by the plurality of first elastomeric phases having a hexagonal geometry.

16. The elastomeric seal as recited in claim 13 wherein the sealing surface has a surface feature defined by a number of repeated peaks and valleys.

17. The elastomeric seal as recited in claim 13 wherein the arrangement of cores is oriented axially to extend radially within the seal.

18. The elastomeric seal as recited in claim 13, wherein a major portion of the seal body not including the at least portion of the sealing surface is formed from a single-phase elastomer.

19. The elastomeric seal as recited in claim 13 wherein the entire seal body is formed from the elastomeric composite construction.

20. An elastomeric seal for use in a rotary cone drill bit comprising:
an annular seal body; and
at least one sealing surface disposed along a section of the body;
wherein at least a portion of the sealing surface is formed from an elastomeric composite construction formed from a plurality of first phases distributed uniformly within and contacting a continuous matrix second phase, wherein the plurality of first phases is formed from an elastomeric material having a hardness that is relatively less than that of an elastomeric material that is used to form the second phase, wherein each first phase is in the form of a core and the second phase is formed from a number of connecting shells that each surround a respective core, wherein the composite construction is characterized in cross section as having a cellular structure defined by the plurality of cores separated radially from one another by the second phase and having a hexagonal geometry.

21. A rotary cone drill bit comprising:
a body having at least one leg extending therefrom;
cutting cones rotatably disposed on an end of the leg; and
one or more elastomeric annular seals interposed between the cutting cone and leg in one or more seal glands, at least one seal comprising a seal body having at least one sealing surface for contacting a drill bit sealing surface, wherein at least a portion of the seal body includes an elastomeric composite construction comprising an ordered arrangement of a number of first elastomeric phases distributed uniformly within and contacting a continuous matrix second elastomeric phase, wherein each first phase is in the form of a core having a defined length and diameter, wherein the second phase is formed from a number of shells that each surround a respective core to form a structural unit, and wherein the structural units are placed adjacent one another with adjacent shells in contact with one another, wherein the structural units are combined within the cores in common alignment with one another so that the composite construction has a cellular structure, and wherein the second elastomeric phase is relatively harder than the first elastomeric phases.

22. The drill bit as recited in claim 21 wherein the cores are commonly oriented to extend circumferentially within the seal.

23. The drill bit as recited in claim 21 wherein the cellular structure is characterized in cross section by the cores having an hexagonal geometry.

24. The drill bit as recited in claim 23 wherein the elastomeric composite construction is used to form at least a portion of the sealing surface, and wherein the sealing surface has a surface feature defined by a number of repeated peaks and valleys.

25. The drill bit as recited in claim 23 wherein the cores are commonly oriented to extend radially within the seal.

26. The drill bit as recited in claim 23, wherein a major portion of the seal body is formed from a single-phase elastomer, and wherein the elastomeric composite construction is positioned along at least a portion of the seal body sealing surface.

* * * * *